United States Patent [19]
Symons

[11] 3,930,450
[45] Jan. 6, 1976

[54] BOAT RIDE FOR AMUSEMENT PARK

[75] Inventor: Robert W. Symons, Canoga Park, Calif.

[73] Assignee: Sid & Marty Krofft Productions, Inc., North Hollywood, Calif.

[22] Filed: June 3, 1974

[21] Appl. No.: 475,406

[52] U.S. Cl................... 104/73; 61/1 F; 61/7; 104/139; 104/154; 104/161; 114/60; 272/32; 302/14
[51] Int. Cl.²............. A63G 3/00; B63H 19/04; B65G 53/30; E02B 5/06
[58] Field of Search............ 104/73, 139, 154, 161; 302/14; 61/1 F, 7; 114/60; 272/32

[56] References Cited
UNITED STATES PATENTS

| | | | |
|---|---|---|---|
| 326,198 | 9/1885 | Bridewell | 104/54 |
| 382,267 | 5/1888 | Mayall | 104/161 |
| 536,357 | 3/1895 | DePalacio | 104/139 X |
| 1,249,455 | 12/1917 | Myers | 104/73 |
| 3,404,635 | 10/1968 | Bacon et al. | 104/73 X |
| 3,807,806 | 4/1974 | Takahashi | 302/14 |

Primary Examiner—M. Henson Wood, Jr.
Assistant Examiner—Howard Beltran
Attorney, Agent, or Firm—Lindenberg, Freilich, Wasserman, Rosen & Fernandez

[57] ABSTRACT

A boat ride system for an amusement park, which includes a main channel and an auxiliary channel extending under the main channel and isolated from it except along a narrow slot. A boat for carrying people includes a hull floating in the main channel, a pair of paddles lying in the auxiliary channel, and a pair of supports extending through the slot and connecting the paddles to the hull. Pumps are utilized to pump water along the auxiliary channel so that the moving water pushes the paddles and therefore moves the hull along the main channel.

16 Claims, 6 Drawing Figures

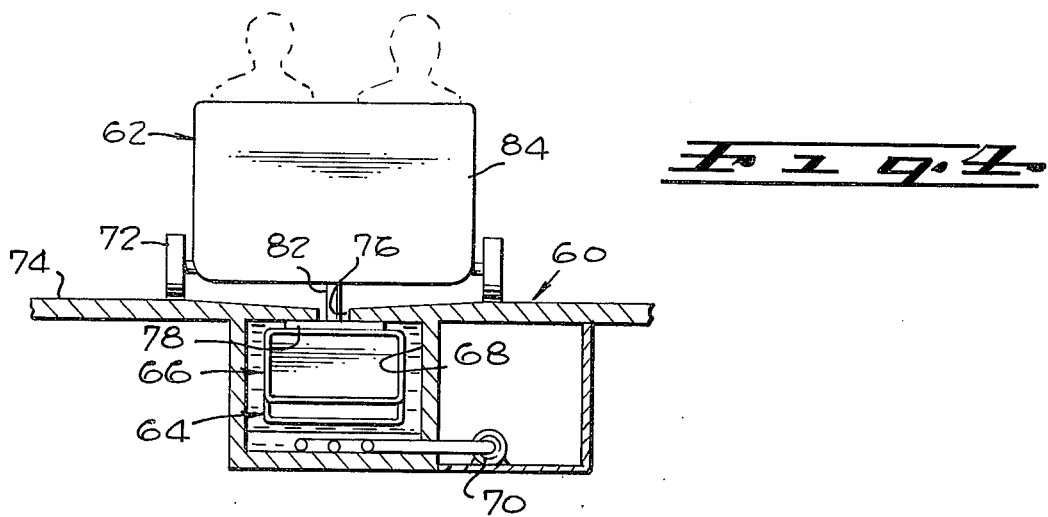
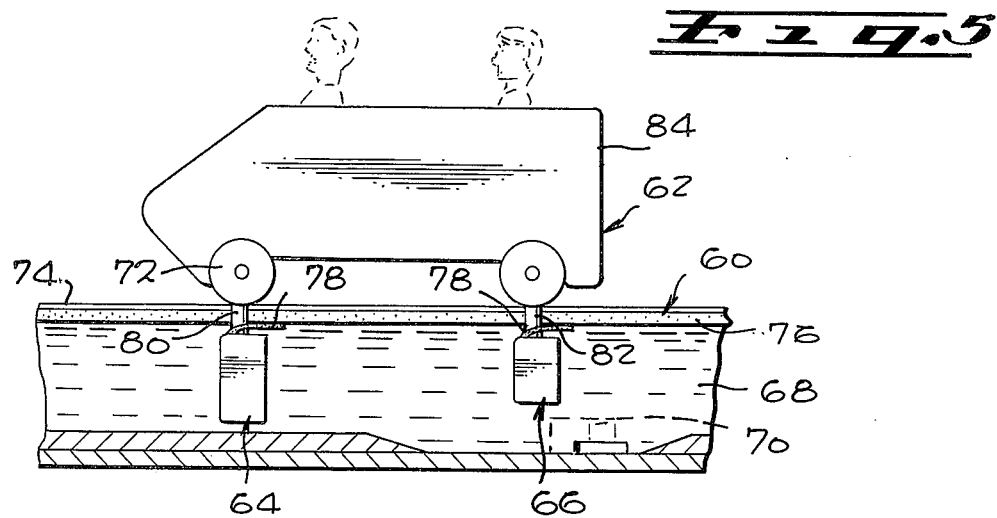
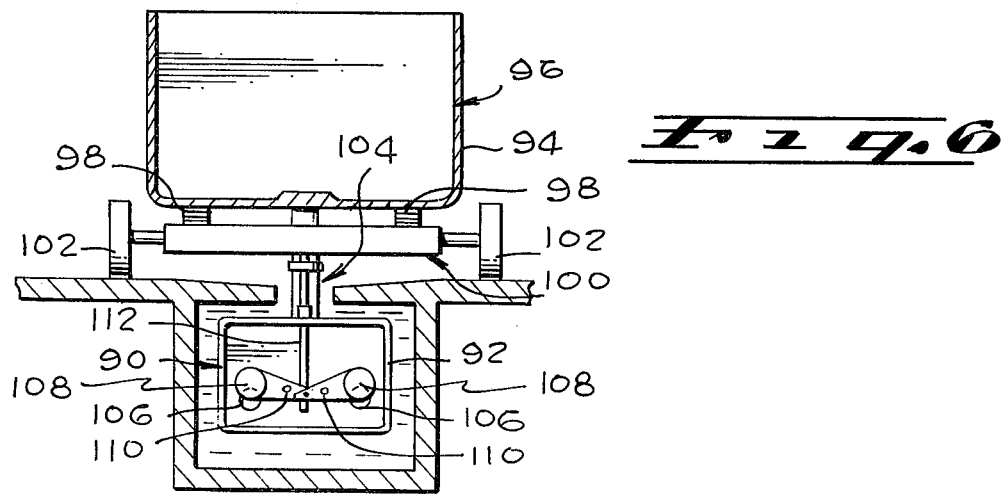

BOAT RIDE FOR AMUSEMENT PARK

BACKGROUND OF THE INVENTION

This invention relates to systems for moving vehicles along predetermined paths.

Amusement parks often have "dark rides" in which people are seated in boats that float along a channel that carries them past animated displays. The boats are typically moved along the channel by pumping water along the channel. The cross-sectional area of a boat is typically only a small fraction of the cross-sectional area of the water-filled portion of the channel, so that a large amount of water normally must be pumped through the channel. While this transport system provides a smooth and vibration-free ride, it has several disadvantages. The propulsion system is inefficient, and it is difficult to provide sharp turns along the waterway inasmuch as at such turns the water swirls so that it tends to tip the boat rather than propel it and the water also tends to ride up the outer side of an open channel.

SUMMARY OF THE INVENTION

In accordance with the present invention, a boat ride apparatus is provided which enables boat propulsion with a minimum of power and along tightly curved paths. The system includes a shallow main channel and an auxiliary channel lying beneath the main channel and isolated from it except along a slot that connects the channels. A boat for carrying people includes a hull floating in the main channel, a pair of paddles lying in the auxiliary channel, and a pair of supports extending through the slot and joining the paddles to the hull. Pumps are provided that move water only along the auxiliary channel, to push the paddles and thereby propel the boat.

The novel features that are considered characteristic of this invention are set forth with particularity in the appended claims. The invention will be best understood from the following description when read in conjunction with the accompanying drawings.

BRIEF DESCRIPTION OF THE DRAWINGS

FIG. 4 is a rear sectional view of another embodiment of the invention which employs a water channel for propelling a wheeled vehicle;

FIG. 5 is a sectional side view of the apparatus of FIG. 4; and

FIG. 6 is a sectional rear view of still another embodiment of the invention wherein the drive effectiveness of a paddle is varied according to the load on the vehicle.

DESCRIPTION OF THE PREFERRED EMBODIMENTS

Figure 1:
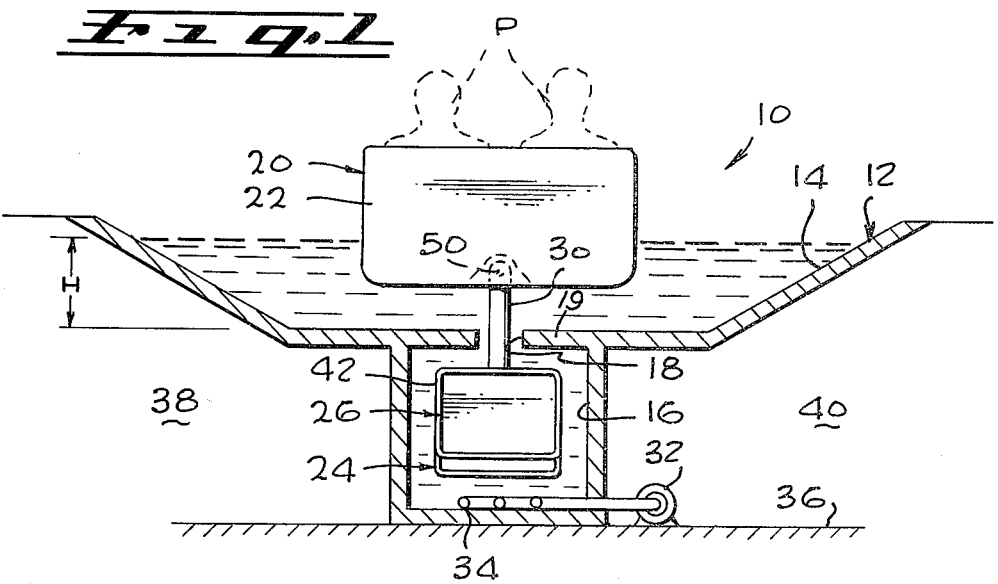
FIG. 1 is a rear sectional view of a boat ride apparatus constructed in accordance with one embodiment of the present invention.
Figure 2:
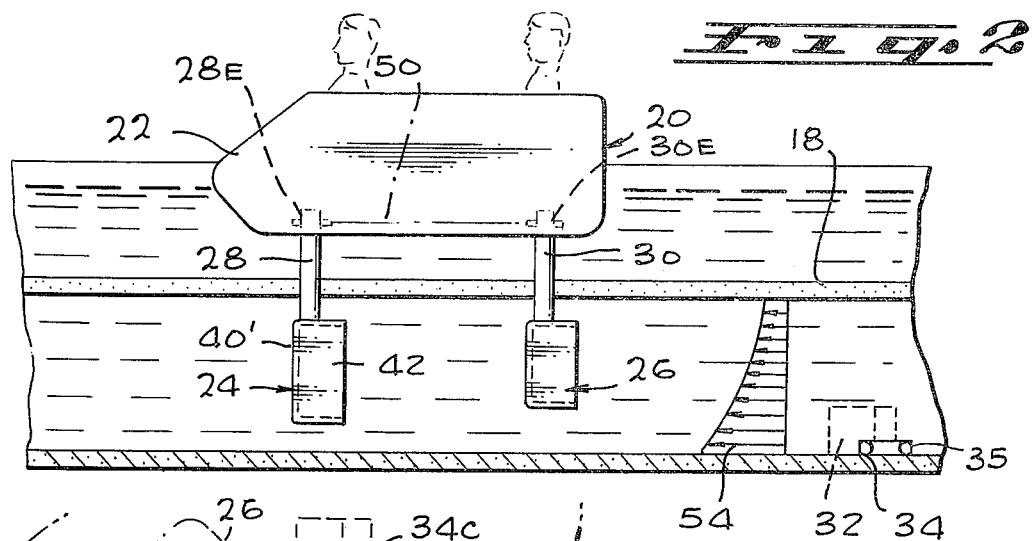
FIG. 2 is a sectional side view of the apparatus of FIG. 1.
Figure 3:
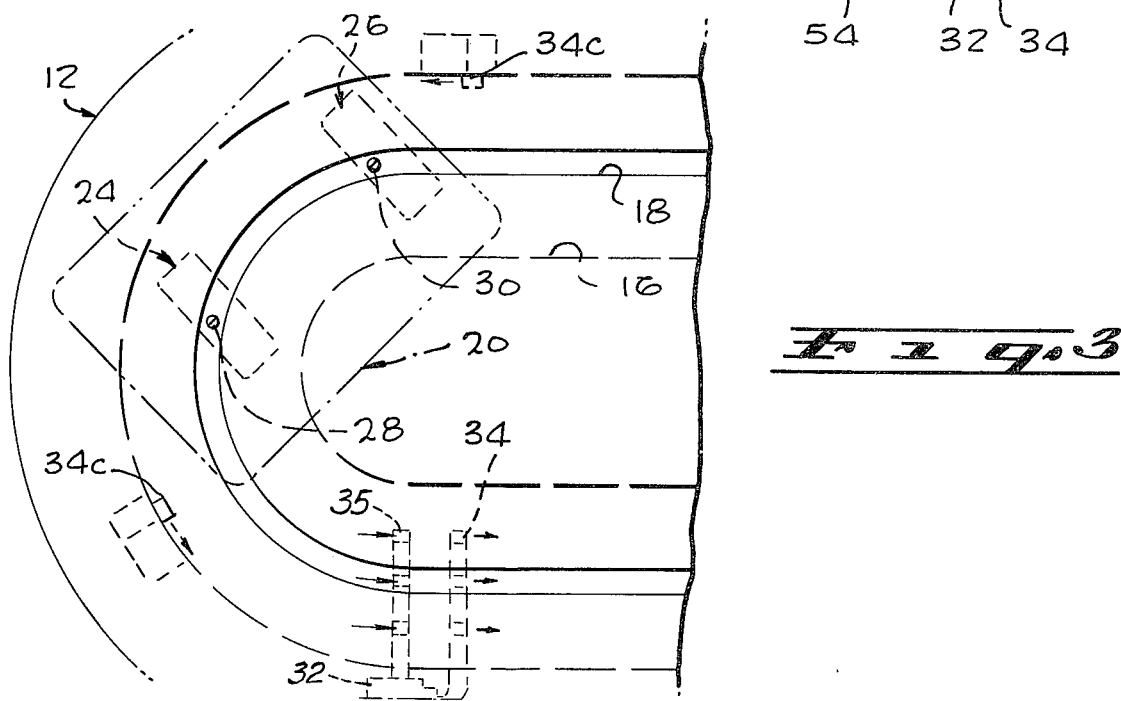
FIG. 3 is a plan view of a portion of the apparatus of FIG. 1, showing a sharp turn portion thereof.

FIGS. 1–3 illustrate a boat ride system 10 of a type suitable for an amusement park to carry passengers P in a quiet and vibration-free manner past displays. The system includes walls 12 forming an elongated main channel 14 that is partially filled with water and an auxiliary enclosed channel 16 that is completely filled with water. The two channels 14 16 are isolated from one another except along a slot 18 in a wall 19 that forms the top of the auxiliary channel 16 and a portion of the bottom of the main channel. A boat 20 for carrying the passengers includes a hull 22 that floats in the main channel 14, a pair of buckets or paddles 24, 26 that lie in the auxiliary channel 16, and a pair of supports 28, 30 that extend through the slot 18 and that connect the paddles to the hull. A series of pumps 32 is arranged along the length of the boatway formed by walls 12, with outlets 34 of the pumps opening into the auxiliary channel 16 to move water therealong. Water is pumped only along the auxiliary channel 16, while water in the main channel 14 is allowed to remain substantially stationary, the water in the main channel being moved only by the action of boats moving therealong and by the interaction of the waters in the two channels through the slot 18.

The water moving through the auxiliary channel 16 pushes against the paddles 24, 26 to propel them and thereby move the boat along the boatway. The boatway formed by the walls 12 may be part of a "dark ride" that is enclosed in a building. In order to minimize the size of the building while providing a boat ride of considerable distance, the boatway is provided with several sharply curved regions such as that shown in FIG. 3 to form a compact sinuous path. The boat 20 is guided along the path by the two supports 28, 30 which extend through the slot 18. The supports 28, 30 can be constructed of tubular members with smooth outer surfaces that form bearings, while the walls of the slot 18 are also made smooth to minimize friction. The supports are only slightly narrower than the slot, with the clearance between each support and the slot walls being preferably less than the width of the support.

The use of an auxiliary channel 16 provides several advantages over the use of only a main channel through which water moves. One important advantage is that turns of small radius can be utilized along the boatway, to permit the boatway to be contained in a building of minimum size. If water were moved only along the open main channel 14, then the water would tend to swirl and ride up along the outer sides of turns, which would tend to cause sideward tipping of the boat. With the rapidly flowing water moving only through the substantially enclosed auxiliary channel 16, the water is largely contained along curves, and sharp curves can be utilized. The use of two support members 28, 30 to extend through the slot 18, enables the boat to execute even sharp turns of a type shown in FIG. 3.

The use of the auxiliary channel 16 enables the use of a relatively shallow main channel 14. Although the height above the ground 36 of water in the main channel 14 is still considerable, a large dry area is available at 38 and 40 under the main channel 14 and on either side of the auxiliary channel 16, to provide space for holding and easily servicing the pumps 32 as well as animation mechanisms utilized with the ride. The relatively shallow main channel 14 also makes emergency movements along the channel safer, inasmuch as the height H of water in the main channel may be only about one and one-half to two feet, as compared to the typical 3 to 4 feet of water utilized in conventional boat rides. Conventional boat rides utilize a deep channel to accommodate tracks that guide the boats, and to contain submerged pumps that lie deep in the water to minimize unattractive turbulance at the surface.

The pumping of water only along the auxiliary channel 16 results in more efficient utilization of pumping energy than if water were pumped along the main channel. This is because the paddles occupy a large proportion of the cross-sectional area of the auxiliary channel 16, so that a high proportion of the water energy can be utilized to propel the boat rather than being merely dissipated as friction on the walls of the channel. The fact that water moves only along a relatively small auxiliary channel means that dynamic responses of the boats can be accurately tested at the factory, rather than requiring testing only at the actual dark ride installation. This is because the dynamic response of the boat is largely determined by the interaction of the paddles with water moving through the auxiliary channel, the effects of water in the main channel on the boat being less variable because water in the main channel has only a relatively slow motion.

The paddles 24, 26 are of a largely bucket shape, with a substantially vertical base wall 40' and with rearwardly extending side walls 42 extending all around the base wall. This counteracts the tendency of water to flow around the paddle rather than to push it, and therefore allows the water to exert a large propulsive force on the paddle. the rearward paddle 26 is made smaller than the forward paddle 24 in order to avoid a tendency towards instability which can arise when a vehicle is pushed from the rear instead of being pulled from the front. The use of a smaller rearward paddle 26 also tends to compensate for the fact that the rearward paddle tends to slow the flow of water so that a larger forward paddle would be required just to equalize the forces applied by the water to the paddles. Even the forward paddle 24 is provided with a smaller height and width than the auxiliary channel 16, in order to account for some vertical movement of the boat as it is loaded and unloaded and to allow for some tipping. It is generally desirable that the paddles occupy only a portion of the cross-sectional area of the auxiliary channel, preferably less than 80% thereof, in order to provide a relatively even flow all along the channel even as the paddles pass a pump outlet.

The hull 22 can tip sidewardly as passengers shift position or at sharp turns. However, the paddles 24, 26 and the guiding and support members 28, 30 do not undergo a corresponding tipping movement because the upper ends 28E, 30E of the guiding members are pivotally mounted about a horizontal and longitudinal axis 50 on the hull 22.

In an amusement park ride, it is generally desirable to propel all boats at about the same speed so that they do not "bunch up" if boats are released from the loading dock at small spacings. However, heavily loaded boats displace more water in the main channel and therefore have more resistance to movement through the nearly stationary water in the main channel. In the present system, the greater resistance is compensated for by the fact that the paddles 24, 26 of a heavily loaded boat lie deeper in the auxiliary channel, and by the fact that water velocity is greater near the bottom of the auxiliary channel. The outlets 34 and inlets 35 of the pumps are located near the bottom of the auxiliary channel. This creates a velocity gradient along the height of the channel of the type indicated by the velocity arrows at 54. Thus, when a boat settles deeper in the water, the paddles lie in regions of greater water velocity, and the speed of all boats is more nearly the same.

The movement of a boat along a sharp curve can be difficult because the water in a channel tends to swirl at a curve and because it is necessary to turn the boat as well as propel it. As shown in FIG. 3, movement around a sharp curve is facilitated by pumping the water faster along the outside of the curve than along the inside. This is accomplished by utilizing only pump outlets 34c near the outside of the curve along the curved portion of the waterway. This not only can minimize swirling of the water, but the higher velocity near the outside of the curve produces a torque on the paddles 24, 26 tending to turn them and the boat, to follow the curve.

The boatway and boats can be constructed in a wide variety of configurations. Although two paddles 24, 26 may be utilized, it is only necessary to use a single paddle in the auxiliary channel to drive a boat. However, it is generally desirable to provide two members 28, 30 extending through the slot 18 in order to guide the boat. The auxiliary channel 16 may be utilized under or at the side of an elongated main channel. The use of an auxiliary channel through which water moves, even may be utilized to propel boats where there is no definite main channel, as where the boat floats in a small lake, or to propel other types of vehicles.

FIGS. 4 and 5 illustrate a portion of a vehicle way 60 for a wheeled vehicle 62, wherein the vehicle is propelled by paddles 64, 66 lying in an enclosed channel 68 through which water is pumped by pump 70. The vehicle is supported on wheels 72 that run along a substantially dry floor or ground surface 74 above the level of the channel. This vehicle system has the same advantage as systems that utilize chains running in a slot under the floor to slowly propel vehicles, of eliminating the need for an engine for each vehicle. The present system has the added advantage of providing a "soft" connection between the vehicle and propulsion system, so that jerking motions are virtually eliminated during starting and stopping and even constant speed operation is smoother. In order to minimize the overflow of water through the slot 76 onto the ground surface 74, deflectors 78 are provided at the top of the paddles. The deflectors 78 extend across the slot 76 near the paddles to minimize the overflow of water due to the resistance to water flow caused by the presence of the paddles. The vehicle 62 is steered along the ground by guide and support members 80, 82 that extend through the slot 76. If necessary, the wheels 72 can be mounted in the manner of furniture casters so they do not interfere with guidance of the vehicles by the members 80, 82.

For a typical wheeled vehicle suspension, the body 84 of the vehicle moves up and down only a small amount as the passenger load varies. FIG. 6 illustrates a paddle assembly 90 which greatly varies the drive capacity of a paddle 92 thereof as the load varies in the cab 94 of a vehicle 96. The paddle has a pair of holes 106 that can be closed and opened by a pair of covers 108 that are pivotally mounted at 110 on the paddle, with the pivoting of the covers controlled by loading of the vehicle. The vehicle cab 94 is supported by leaf springs 98 on a truck 100 that has wheels 102 for supporting it on the ground. A guide and paddle support member 104 has an upper end fixed to the vehicle cab 94 and a lower end fixed to the vehicle cab 94 and a lower end fixed to the paddle 92. An activating rod 112 slideable along the paddle 92, has an upper end mounted on the truck 100 and a lower end pivotally connected to the covers 108. When the vehicle cab 94 is heavily loaded, the support member 104 and paddle 90 move down a small but appreciable amount, but the rod 112 hardly moves at all. As a result, the covers 108 pivot in a direction to move over the holes 106 and increase the effective drive capacity of the paddle. Conversely, when the load is removed from the vehicle cab, the paddle 92 moves up and the rod 112 pivots the covers away from the holes 106, which allows water to pass therethrough to decrease the drive capacity of the paddle. Of course, a variety of mechanisms can be utilized to sense loading and to increase or decrease the drive capacity of a paddle as the load respectively increases or decreases.

Thus, the invention provides a vehicle drive apparatus and especially a boatride apparatus, which has the advantage of typical boatrides wherein moving water propels a boat, but which provides a more efficient, compact, and more easily tested system. This is accomplished by utilizing an auxiliary channel largely isolated from a waterway or other path in which the passenger-carrying portion of a vehicle moves, by pumping water rapidly only along the auxiliary channel, and by connecting paddle means in the auxiliary channel to the vehicle body to propel it.

Although particular embodiments of the invention have been described and illustrated herein, it is recognized that modifications and equivalents may readily occur to those skilled in the art and consequently, it is intended that the claims be interpreted to cover such modifications and equivalents.

The embodiments of the invention in which an exclusive property or privilege is claimed are defined as follows:

1. A vehicle system comprising:
   walls forming a vehicle pathway including an elongated channel with a wall thereof which has an open slot narrower than the channel and extending along the top of the channel;
   a vehicle having a body lying above said slot, at least one support member coupled to said body and extending through said slot into said channel, and paddle means lying in said channel and attached to said support for receiving forces from water moving along the channel; and
   means positioned along said channel for pumping and directing the flow of the water along the channel.

2. The system described in claim 1 wherein:
   said vehicle, including said paddle thereof, moves down and up in accordance with the load in said body respectively increasing and decreasing; and
   said pumping means moves water at a greater velocity near the bottom of the channel than near the top thereof, whereby to increase the propulsion force as the vehicle is increasingly loaded.

3. The apparatus described in claim 1 including:
   load compensating means responsive to the load in said body for increasing or decreasing the drive capacity of said paddle means as the load respectively increases and decreases.

4. The system described in claim 1, wherein:
   said pathway and channel include a curved portion; and
   said pumping means comprises means for moving water faster around the outside of said curved channel portion than along the inside thereof, including a water outlet positioned along said curved portion of said channel near the outside of the turn.

5. The system described in claim 1, including:
   deflector means coupled to said paddle means to move with it, for covering portions of said slot near said paddle means, whereby to minimize the flow of water out of said channel through said slot as the vehicle moves by.

6. The system described in claim 1, wherein:
   said walls form a main channel lying above said first named channel, said main channel containing water, and said body of said vehicle comprising a hull floating in the water of said main channel.

7. The system described in claim 1, wherein:
   said vehicle includes wheels lying above the level of said channel and rollably supporting said body.

8. A boat ride apparatus comprising:
   walls forming an elongated main channel for holding water to carry a boat, said walls also forming an auxiliary water-holding channel extending parallel to said main channel and substantially isolated from it except along a slot that connects said channels, said slot being narrower than said auxiliary channel to minimize the interaction of waters in the two channels; and means for directing the flow and moving the water so that the water moves at least along the bottom of said auxiliary channel while allowing water to move at a slower speed along said main channel, whereby to enable propulsion of a boat along said main channel by a paddle or the like that extend from the boat into the auxiliary channel.

9. The apparatus described in claim 8 including:
   a boat having a hull floating in said main channel, paddle means wider than said slot and lying in said auxiliary channel, and a support extending through said slot and connecting said hull to said paddle means.

10. The apparatus described in claim 9, wherein:
    said paddle means includes forward and rearward paddles with the forward paddle positioned forward of the rearward paddle, said rearward paddle having a smaller effective area then said forward paddle.

11. The apparatus described in claim 9, wherein:
    said paddle means includes a bucket-shaped member with a substantially vertical base wall and with substantially rearwardly extending side walls extending all around said base wall.

12. A compact amusement ride comprising:
    a boatway including a portion curved at a small radius of curvature, said boatway including a shallow main channel and an auxiliary channel lying beneath the main channel and including a separating wall at the top of said auxiliary channel separating said channels, said separating wall including a slot;
    a boat having a hull floating in said main channel, two members having upper ends coupled to the hull and extending through said slot, said members spaced from one another along the length of said guideway and each member having bearing means thereon for engaging the walls of said slot, and at least one paddle means coupled to one of said members and lying in said auxiliary channel; and means positioned along said auxiliary channel for moving water generally along the length direction of said auxiliary channel.

13. The ride described in claim 12, wherein:
    said water moving means moves water at a greater velocity along the outside than the inside of the auxiliary channel of said curved boatway portion.

14. Boat ride apparatus comprising:

means defining a bottom wall and side walls for holding water, and defining an auxiliary channel extending under said bottom wall, said bottom wall having a slot extending over said auxiliary channel in a direction along the length of the channel;

water completely filling said auxiliary channel and lying over said bottom wall at a depth less than the height of said side walls;

a boat having a hull floating in the water above said bottom wall, a pair of members spaced from one another along the length of said slot and having upper ends mounted on said hull and lower portions extending through said slot into said auxiliary channel, and at least one paddle means lying in said auxiliary channel and mounted on one of said members; and pump means for moving water generally along the length direction of said auxiliary channel.

15. The apparatus described in claim 14, wherein:
the upper end of each of said members is pivotally connected to said hull to permit pivoting about a substantially horizontally and longitudinally extending axis, whereby the members and paddle means are able to resist tilting when the boat rocks.

16. The apparatus described in claim 14, wherein:
said pump means includes outlets near the bottom of said auxiliary channel for moving water near the bottom of the auxiliary channel faster than water near the top of the auxiliary channel.

* * * * *